United States Patent [19]
Lovatt

[11] Patent Number: 5,830,255
[45] Date of Patent: *Nov. 3, 1998

[54] FORMULATION OF PHOSPHORUS FERTILIZER FOR PLANTS

[75] Inventor: Carol J. Lovatt, Riverside, Calif.

[73] Assignee: The Regents of the University of California, Alameda, Calif.

[*] Notice: The term of this patent shall not extend beyond the expiration date of Pat. No. 5,514,200.

[21] Appl. No.: 642,574

[22] Filed: May 3, 1996

Related U.S. Application Data

[63] Continuation of Ser. No. 192,508, Feb. 7, 1994, Pat. No. 5,514,200.

[51] Int. Cl.⁶ .................................................. C05B 15/00
[52] U.S. Cl. ........................... 71/11; 71/27; 71/32; 71/41; 71/64.1
[58] Field of Search ................................ 71/11, 27, 32, 71/41, 64.1

[56] References Cited

U.S. PATENT DOCUMENTS

| | | | |
|---|---|---|---|
| 3,798,020 | 3/1974 | Parham et al. | 71/1 |
| 4,075,324 | 2/1978 | Thizy et al. | 424/128 |
| 5,395,418 | 3/1995 | Vetanovetz et al. | 71/64.1 |

FOREIGN PATENT DOCUMENTS

| | | | |
|---|---|---|---|
| 2359077 | 7/1976 | France | 71/11 |
| 2378587 | 1/1979 | France | 71/64.1 |
| 34171331 | 11/1985 | Germany | 71/11 |
| 291482 | 12/1986 | Japan | 71/11 |
| 74784 | 3/1992 | Japan | 71/64.1 |
| 655373 | 4/1979 | U.S.S.R. | 71/11 |
| 86/00613 | 1/1986 | WIPO . | |

OTHER PUBLICATIONS

Lovatt, C.J., "A Definitive Test to Determine Whether Phosphite Fertilization can Replace Phosphate Fertilization to Supply P in the Metabolism of 'Hass/ on Duke 7. A preliminary report," *Proc. Of Second World Avocado Congress*, p. 224 (1992).

Unknown, "Foliar Applications do Double Duty," *Citrograph*, 75(7):161 (1990).

MacIntire et al., "Fertilizer Evaluation of Certain Phosphorus, Phosphorous, and Phosphoric Materials by Means of Pot Cultures," *Agronomy Journal*, 42(11):543 (1950).

Grossl et al., "Precipitation of Dicalcium Phosphate Dihydrate in the Presence of Organic Acids," *Soil Science Society of America Journal*, 55(3):670 (1991).

Product Information Brochure for "Supa Stand Phos: Supa Protective Pop–Up Starter," Published by Agrichem Manufacturing Ind.: Australia, 2 pages (Aug. 1990).

Product Information Brochure for "Supa Stand Phos: Supa Crop," Published by Agrichem Manufacturing Ind.: Australia, 1 page (Oct. 1990).

Product Information Brochure for "Supa Stand Phos: Supa Protective Pop–Up Starter," Published by Agrichem Manufacturing Ind.: Australia, 2 pages.

Product Information Brochure for "Kelpak: Liquid Seaweed Concentrate," Published by Agrichem Manufacturing Ind.: Australia, 1 page.

Product Information Brochure for "Organic Extract: Typcial Analysis," Published by Agrichem Manufacturing Ind.: Australia, 1 page.

*Primary Examiner*—Wayne Langel
*Attorney, Agent, or Firm*—Walter H. Dreger; Jan P. Brunelle

[57] ABSTRACT

Concentrated phosphorus fertilizers are disclosed that comprise a buffered composition of an organic acid and salts thereof and a phosphorous-containing acid and salts thereof. The concentrated phosphorus fertilizers can be diluted with water of pH ranging from about 6.5 to about 8.5 at ratios of concentrate to water at about 1:40 to about 1:600 to result in a fertilizer having a pH in the range acceptable for foliar uptake of phosphorus.

52 Claims, No Drawings

FORMULATION OF PHOSPHORUS FERTILIZER FOR PLANTS

CROSS-REFERENCE TO RELATED APPLICATIONS

This application is a continuation of U.S. Ser. No. 08/192,508, filed Feb. 7, 1994, now U.S. Pat. No. 5,514,200.

BACKGROUND OF THE INVENTION

Fertilizers are added to the soil of crops or in some cases they can be applied directly to crop foliage to supply elements needed for plant nutrition. Seventeen elements are known to be essential to the health and growth of plants. Typically, nitrogen, phosphorus, and potassium are provided in the greatest quantity. With increasing knowledge of the role of each of the nutrients essential to plants, there is a better understanding of the importance of providing a given nutrient at the appropriate stage of phenology. To accomplish this, rapid changes in fertilizer formulations and methods of application have been necessary.

Another factor changing fertilization formulations and methods is due to pressure from federal, state and local regulatory agencies and citizen groups to reduce the total amount of fertilizer in general, and of specific nutrients in particular, being applied to the soil. Additionally, the loss of registration of existing synthetic plant growth regulators and organic pesticides and the prohibitively high costs involved in the successful registration of new ones, also plays a role in the changing arena of crop fertilization.

The principal source of phosphorus for the fertilizer industry is derived from the ores of phosphorus-containing minerals found in the Earth's crust, termed phosphate rock. Elemental phosphorus does not exist in nature; plants utilize phosphorus as the dihydrogen phosphate ion ($H_2PO_4^-$). While untreated phosphate rock has been used for fertilizer, it is most commonly acidulated with dilute solutions of strong mineral acids to form phosphoric acid, which is more readily absorbed by crops.

Until recently, phosphate and polyphosphate compounds were considered the only forms in which phosphorus could be supplied to plants to meet the plant's nutritional need for phosphorus. Indeed, the only phosphite compound cited for use as a fertilizer in the *Merck Index* (M. Windhols, ed., 1983, 10th edition, monograph no. 1678) is calcium phosphite ($CaHPO_3$). No phosphite fertilizer formulations are listed in *The Farm Chemical Handbook* (Meister Publishing Co., 1993, Willoughby, Ohio 834 p.) or *Western Fertilizer Handbook* (The Interstate, Danville, Ill. 288 p.) Historically, calcium phosphite was formed as a putative contaminant in the synthesis of calcium superphosphate fertilizers [McIntyre et al., *Agron. J.* 42:543–549 (1950)] and in one case, was demonstrated to cause injury to corn [Lucas et al., *Agron. J.* 71:1063–1065 (1979)]. Consequently, phosphite was relegated for use only as a fungicide (Alliete®; U.S. Pat. No. 4,075,324) and as a food preservative.

More recently, it has been shown that plants can obtain phosphorus from phosphite [Lovatt, C. J., Mar. 22, 1990, "Foliar phosphorus fertilization of citrus by foliar application of phosphite" In: Citrus Research Advisory Committee (eds) Summary of Citrus Research, University of California, Riverside, Calif. pp 25–26; Anon., May, 1990, "Foliar applications do double duty" In: L. Robison (ed) Citrograph Vol. 75, No. 7, p 161; Lovatt, C. J., 1990, "A definitive test to determine whether phosphite fertilization can replace phosphate fertilization to supply P in the metabolism of 'Hass' on 'Duke 7':—A preliminary report" California Avocado Society Yearbook 74:61–64; Lovatt, C. J., 1992]. Formulations based on phosphorous acid and hypophosphorous acid, as phosphite is, generally undergo oxidation to phosphate and thus lose the benefits that could be derived from the use of phosphite fertilization applications.

The phosphate and polyphosphate fertilizers currently used have a number of properties that compromise their desirability as fertilizers. Generally, they tend to form precipitates during storage and shipping. This limits the ability to formulate concentrated solutions of fertilizers. Additionally, formulations must generally be maintained at a narrow pH range to prevent precipitation, resulting in fertilizers that are limited to particular uses. Another drawback of phosphate fertilizers is that they are not readily taken up by the foliage of many plants and must instead be delivered to the soil for uptake by plant roots. The mobility of phosphate fertilizers in the soil is limited leading to rapid localized depletion of phosphorus in the rhizosphere and phosphorus deficiency of the plant. Frequent reapplication of phosphate fertilizers is undesirable because it leads to leaching of phosphate into the groundwater resulting in eutrophication of lakes, ponds and streams.

Phosphate and polyphosphate fertilizers have also been shown to inhibit the beneficial symbiosis between the roots of the plants and mycorrhizal fungi. They tend to support the growth of algae and promote bacterial and fungal growth in the rhizosphere, including the growth of pathogenic fungi and other soil-borne pests.

Even though phosphorus, once in the plant, is very phloem mobile (i.e. readily moving from old leaves to young tissues), phosphate is poorly absorbed through the leaves of most plant species. This is unfortunate because successful foliar phosphorus feeding would result in the application of less phosphate fertilizers to the soil and reduce phosphorus pollution of the ground water.

Accordingly, there is a need for a phosphorus fertilizer that can be utilized in irrigation systems and applied to foliage without the formation of precipitates that reduce nutrient availability and uptake by the plant and plug emitters and sprayers. There is also a need for new methods of fertilizer application that allow nutrients in a readily available form to be supplied at the exact time the plant needs them. This need includes the facility of a foliar product to be sold in a single formulation for use as a concentrated material for airplane or helicopter application or as a dilute solution for ground spray application and yet able to be maintained at a suitable pH range optimal for leaf uptake despite the need to be diluted prior to application.

Additionally, there is a demand for phosphorus fertilizers that have the facility to be used as liquids or solids (granule or powder). There is also a demand for fertilizers that do more than just supply nutrients. It is desired that the fertilizers also have demonstrated plant growth regulator activity, increase the plants' resistance to pests, promote plant health in general and root health in particular, increase the production of allelopathic compounds, increase pre- and post-harvest quality, improve stress tolerance, enhance beneficial symbioses, and improve yield over existing traditional soil or foliar fertilizers.

SUMMARY OF THE INVENTION

Given the above-mentioned deficiencies and demands of fertilizers in general, and of phosphorus fertilizers in particular, it is an object of the present invention to provide phosphorus to plants in a formulation that renders phosphorus readily available to the plants under a number of application methods such as through soil, foliar uptake, irrigation, and other methods.

It is also an object that the phosphorus fertilizer formulations be conveniently formulated in concentrated solutions that are stable during storage and shipping.

Another object of the present invention is to provide a phosphorus fertilizer that is not as inhibitory to mycorrhizal fungi as traditional phosphate fertilizers.

It is a further object of the present invention to provide a phosphorus fertilizer that does not support the growth of algae to the same degree that traditional phosphate fertilizers do.

Additional objects and features of the invention will be apparent to those skilled in the art from the following detailed description and appended claims.

The above objects and features are accomplished by a concentrated phosphorus fertilizer comprising a buffered composition comprising an organic acid and salts thereof and a phosphorous-containing acid and salts thereof. The concentrated phosphorus fertilizer can be diluted with water of pH ranging from about 6.5 to about 8.5 at ratios of concentrate to water at about 1:40 to about 1:600 to result in a fully solubilized fertilizer having a pH in a range acceptable for foliar uptake of phosphorus.

In one embodiment, the phosphorous-containing acid is selected from the group consisting of phosphorous acid, hypophosphorous acid, polyphosphorous acid, and polyhypophosphorous acid and the organic acid is preferably selected from the group consisting of dicarboxylic acids and tricarboxylic acids such as citrate.

In one embodiment, the concentrated phosphorus fertilizer is an essentially clear liquid devoid of precipitate that can be diluted at a ratio of about 1:40 to about 1:600 with water having pH of about 6.5 to about 8.5, to result in a fertilizer having a pH of about 5.0 to about 7.0, and more preferably from about 5.5 to about 6.5, to facilitate the uptake of phosphorus by a variety of plants.

A method of providing phosphorus to plants is also disclosed. The method comprises diluting a concentrated phosphorus fertilizer comprising a buffered composition comprising an organic acid and salts thereof and a phosphorous-containing acid and salts thereof with water to form a substantially fully solubilized use-dilution fertilizer having a pH in a range acceptable for foliar uptake of phosphorus, and applying the fertilizer to the plant foliage.

DETAILED DESCRIPTION OF THE INVENTION

The present invention provides phosphorus fertilizers essentially devoid of phosphate. The fertilizer comprises a double or multiple buffer system of organic acids and their salts with a phosphorous-containing acids and their salts. The formulation stabilizes the phosphorous against oxidation to phosphate. Suitable phosphorous-containing acids are phosphorous acid and polyphosphorous acid, based generally on the formula $H_3PO_3$, and hypophosphorous acid and polyhypophosphorous acid, based generally on the formula $H_3PO_2$. Phosphite, the salt of phosphorous acid, has properties that are known to be beneficial to crop production. It is taken up through the foliage of avocado and citrus, two species which classically do not take up phosphate through their foliage. Phosphite has fungicidal properties with regard to some species of pathogenic fungi: *Rhizoctonia solani, Botrytis cinerea, Piricularia oryzae, Plasmopora viticola, Phytophthora cinnamomi,* and *Phytophthora parasitica.*

Recently, it has been demonstrated that phosphite also serves as a source of metabolically active phosphorus in plants. The properties of phosphite that make it desirable as a fertilizer are enhanced when it is formulated according to the present invention as a double or multiple buffer with phosphorous acid, hypophosphorous acid, polyphosphorous acid and/or polyhypophosphorous acid and their respective salts and organic acids and their salts per this invention.

Suitable organic acids have the formula R—COOH or R—COO⁻ where R is hydrogen or a carbon-containing molecule or group of molecules. Suitable organic acids are those that maintain the phosphite ion in a substantially fully solubilized form upon dilution with water at pH varying from about 6.5 to about 8.5 and that result in a use-dilution fertilizer having a foliage-acceptable pH for phosphorus uptake. Preferred organic acids are dicarboxylic and tricarboxylic acids.

By the term "substantially fully solubilized" it is meant that upon dilution, the phosphite does not precipitate, or at least not appreciably, so as to affect administration of the liquid product to the plant foliage, and thus is in a form available to the plant. With present phosphite fertilizers, there is a tendency for phosphite to precipitate if diluted with alkaline water, thereby rendering the phosphite in a form that is unavailable to the plant for uptake. By the term "foliage-acceptable pH for phosphorus uptake", it is meant a pH that allows phosphorus to be absorbed by the plant without causing damage to the foliage. A foliage-acceptable pH for phosphorus uptake usually ranges between about 5.0 to about 7.0, and preferably between about 5.5 to about 6.5. Phosphorus is most readily taken up by foliage at pH 6.0. Depending on the plant species, a pH below 5.0 can cause damage to leaves and/or the flowers and/or fruit. At higher pH, between about 7.0 to about 7.5, there is reduced uptake of nutrients, although generally there is no plant damage. A pH between about 7.5 and 8.0, depending on the plant species, plant damage may result. A pH greater than 8.0, generally causes damage to the plant in addition to reducing uptake of the nutrients. Accordingly, suitable organic acids are those that help provide a "buffered composition" having the desired pH range. This means that a "use-dilution fertilizer" having an acidic to neutral pH (pH 5.0 to 7.0) can be achieved upon high dilutions (up to about 1/600) of the concentrated fertilizer with highly alkaline water (up to a pH of about 8.5).

Organic acids that meet this criteria include but not limited to intermediates in the Kreb's Tricarboxylic Acid Cycle, amino acids such as glutamic acid and aspartic acid, vitamin acids such as ascorbic acid and folic acid, and their respective salts. Particularly preferred organic acids are dicarboxylic and tricarboxylic acids selected from the group consisting of citrate, pyruvate, succinate, fumarate, malate, formate, oxaloacetate, citrate, cis-aconitate, isocitrate, and α-ketoglutarate. Citrate is a particularly preferred organic acid because of it is relatively inexpensive and readily available.

These formulations allow the maintenance of continued solubility, and thus availability for uptake by plants, of phosphorus, with or without other nutrients, over a significantly wide range of concentrations and pHs. The increased solubility of these formulation over that of phosphate or phosphite fertilizers makes it possible to prepare fertilizers with a greater concentration of phosphorus per unit volume than traditional phosphate or polyphosphate fertilizers. The resulting pH of these fertilizers varies significantly depending upon the pH of the water used, thus affecting the availability of the nutrients for foliar uptake. In contrast, the highly concentrated fertilizers of the present invention, which can be diluted with water at a ratio of about 1:600, allow for more cost effective shipping, handling, and application. They result in greater uptake of phosphorus by the canopy of plants than traditional phosphate or recent phosphite fertilizers not formulated in this manner.

The formulations provided herein also make it possible to formulate various combinations of other essential plant nutrients or other inorganic or organic compounds as desired and maintain their solubility when used over a wide range of concentrations and pHs, which is not possible for present phosphate or phosphite fertilizers. For example, boron, manganese, calcium, iron and other elements can be provided at relatively high concentrations in these formulations. Thus, these phosphorus fertilizers also enhance the canopy uptake of other mineral nutrients essential to plants. They can be used as a canopy application to improve pre- and post-harvest crop quality.

Formulations can also prepared with copper. However, when high concentrations of copper are used, the copper is not fully solubilized. In this situation, the insoluble copper is desirable as it prevents rapid uptake of the copper and thus minimizes the potential for copper toxicity. As the insoluble copper is rewetted over night by dew, dissolution occurs so that additional copper is taken up. The buffering capacity of the formulation maintains the pH at a foliage-acceptable pH when the insoluble copper is rewetted so that conditions are optimal for uptake and are benign to the plant tissues. While copper is an element essential to plants, it is required in only small amounts. In relation to nitrogen, plants require, in general, 10,000- to 75,000-fold less copper. Provided to the foliage of the plant at the rate provided by this formulation, copper is a very effective fungicide, in addition to being a plant nutrient and fertilizer.

In addition to the above-mentioned advantages, the formulations disclosed have a direct benefit to the environment. Because the formulations allow successful foliar feeding of phosphorus to a number of plants that do not effectively take up phosphorus when supplied in phosphate or polyphosphate forms, and because these formulations enhance the uptake of other nutrients, they are cost-effective and can replace less efficient, traditional soil-feeding methods. This results in reducing phosphate pollution of the groundwater and eutrophication of freshwater ponds, lakes and streams.

The phosphorus fertilizers disclosed herein can also be advantageously applied through the soil or by irrigation systems as solid (granular) or liquid formulations. These formulations can be used at pHs sufficiently low to clean irrigation lines and alter the pH of the soil to solve alkalinity problems while supplying essential nutrients to plants. Example 2, below discloses a suitable formulation for irrigation application. With irrigation application, the fertilizer flowing through the irrigation system will typically have a pH lower than about 2.5, usually less than about pH 1.5. The low pH is designed to supply phosphorus while killing bacteria and algae (slime) which plug irrigation lines, thus cleaning the lines. The low pH also dissolves calcium carbonate deposits at and around the emitters, and solubilizes the calcium carbonate so $Ca^{2+}$ is available to the plant. Once delivered to the soil near the plant, sufficient water is applied to achieve a pH suitable for phosphorus uptake by the plant. The form in which the phosphorus is supplied in these formulations is more mobile than phosphate fertilizers or than the simple salts of phosphorous acid, and thus more available and more readily taken up by the roots of plants. An advantage of these formulations is that the form in which phosphorus is supplied does not inhibit the development of mycorrhizal fungi to the same degree that traditional phosphate fertilizers do. The present compositions can also be formulated with certain nutrients in addition to phosphorus that are readily absorbed through soil applications at pH of about 5.5 to about 7.0. Such nutrients include nitrogen, calcium, magnesium, potassium, molybdenum, boron, and sulfur.

Another advantage with the phosphorus fertilizers disclosed herein is that they do not support the growth of green algae to the same degree that traditional phosphate fertilizers do. This is of significant importance to agriculture, commercial nurseries, the ornamental and cut flower industry, and the home and garden industry, as it will prevent the growth of green algae which typically proliferate and plug irrigation emitters, foul pots and benches, and provide a niche for the growth of pathogenic bacteria and fungi. These formulations also endow the phosphorus fertilizer with anti-viral, anti-bacterial and anti-fungal activity. This bacterialcidal activity in a phosphorus fertilizer makes it possible to use this fertilizer to inhibit ice-nucleating bacteria to thus protect plants from frost damage.

Methods of Preparation

The phosphorus fertilizers are prepared by first forming solutions of the phosphorous and organic acids. Other desired nutrients can then be added with constant stirring. The amount of phosphorous relative to organic acid is not critical, as long as appropriate buffering and solubility are achieved. Generally the amount of organic acid that is added will depend upon the form in which the nutrient elements are added. For example, if calcium is to be added in the form of calcium hydroxide (a base), then the acid form of the organic acid, for example citric acid, would be used rather than its salt, citrate. In addition to the desired nutrients, other additives, that are known in the fertilizer industry, can be added. These include, for example, wetting-agents, surfactants, spreaders, stickers etc., and are described in *The Farm Chemical Handbook,* supra (incorporated herein by reference). The fertilizer compositions can also be prepared as solid formulations, identical to the liquid ones by simply leaving out all of the water. The properties are the same as the liquid formulations but have the additional advantage of weighing less for the same amount of nutrient.

Methods of Application

The fertilizer is applied according to crop-specific recommendations which will depend upon the application method (foliar, soil, irrigation, etc.), time of application, rate of application, and product formulation. Crops that will benefit from the fertilizer include, but are not limited to, avocado, citrus, mango, coffee, deciduous tree crops, grapes and other berry crops, soybean and other commercial beans, corn, tomato, *cucurbits* and *cucumis* species, lettuce, potato, sugar beets, peppers, sugarcane, hops, tobacco, pineapple, coconut palm and other commercial and ornamental palms, hevea rubber, and ornamental plants.

In addition to the foliar, soil, and irrigation application methods mentioned above, the present fertilizer may prove beneficial to certain crops through other application methods. For example, trunk paints or other methodologies may provide for a continuous low supply of fertilizers, such as, for example, "intravenous" feeding as practiced in the boron nutrition of soybeans.

In order that the invention described herein may be more fully understood, the following examples are set forth. All chemicals used were of analytical reagent quality and approximately 100% by weight unless otherwise specified. All formulations are expressed in terms of weight to volume.

It should be understood that these examples are for illustrative purposes only and are not to be construed as limiting the scope of the invention in any manner.

EXAMPLE 1

A formulation was prepared of 1 gallon of 0-40-0 fertilizer with 3.86 lbs $H_3PO_3$, 1.34 lbs tripotassium citrate, 1.34 lbs of trisodium citrate, and 4.0 lbs of 58% ammonium hydroxide. The components were dissolved in water with constant stirring. This single formulation can be used at a rate of 2 quarts in as little as 20 gallons of water of pH 6.5 to 8.5 up to 300 gallons of water of pH 6.5 to 8.5 and maintain a pH between 5.5 to 6.5 without the formation of any precipitate.

EXAMPLE 2

A formulation was prepared of 1 gallon of 0-40-0 fertilizer with 3.86 lbs $H_3PO_3$ and 0.5 lbs citric acid. This formulation is stable at pH 1.0 or less and is designed for application through the irrigation system. It is stable against oxidation and precipitation when supplied through the irrigation water.

EXAMPLE 3

A formulation was prepared of 1 gallon of 0-30-0 fertilizer with 74.89% elemental boron with 2.89 lbs $H_3PO_3$, 28.67 lbs borax ($Na_2B_4O_7.10\ H_2O$), 17.16 lbs boric acid ($H_3BO_3$), 1.54 lbs $H_2SO_4$ and 2.67 lbs citric acid. A solution of the phosphorous and citric acid was first prepared, then the other elements were added with constant stirring. This formulation can be used at the rate of 2 quarts in as little as 20 gallons of water of pH between 6.5 to 8.5 up to 300 gallons of water of pH 6.5 to 8.5 and maintain a pH between 5.5 to 6.5 without the formation of any precipitate.

EXAMPLE 4

A formulation was prepared of 1 gallon of 0-30-0 fertilizer with 21.57% Zn and 23.22% Mn with 2.89 lbs of $H_3PO_3$, 7.92 lbs $ZnSO_4$, 7.16 lbs $Mn(H_2PO_2)_2.H_2O$, 0.61 lbs citric acid and 0.87 lbs 58% $NH_4OH$. This formulation can be used at the rate of two quarts in as little as 20 gallons of water of pH between 6.5 to 8.5 up to 300 gallons of water of pH between 6.5 to 8.5 and maintain a pH between 5.5 to 6.5 without the formation of any precipitate.

EXAMPLE 5

A formulation was prepared of 1 gallon of 0-30-0 fertilizer with 5.4% Ca. It was packaged in a two-container system where 1 gallon of solution A contained 2.89 lbs $H_3PO_3$, 0.68 lbs $Ca(OH)_2$, and 0.28 lbs citric acid, and 1 gallon of solution B contained 0.16 lbs $Ca(OH)_2$, 0.60 lbs KOH, 3.34 lbs 58% $NH_4OH$, 0.28 lbs citric acid, and 0.67 lbs EDTA (ethylenediaminetetraacetic acid). Two quarts of solution A can be added to as little as 20 gallons of water of pH between 6.5 to 8.5 up to 300 gallons of water of pH between 6.5 to 8.5 followed by the addition of two quarts of solution B. The final solution is between pH 5.5 to 6.5 and without precipitation.

A formulation of 1 gallon of 0-30-0 fertilizer with 4.32% Ca can be made without requiring EDTA. This formulation is also packaged in a two-container system where 1 gallon of solution A contains 2.89 lbs $H_3PO_3$, 0.67 lbs $Ca(OH)_2$ and 0.28 lbs of citric acid, while 1 gallon of solution B contains 2.67 lbs of 58% $NH_4OH$, 0.6 lbs KOH. Two quarts of solution A can be added to as little as 20 gallons of water of pH between 6.5 to 8.5 up to 300 gallons of water of pH between 6.5 and 8.5 followed by the addition of two quarts of solution B. The final pH of the solution is between 5.5 and 6.5 and without precipitation.

EXAMPLE 6

A formulation was prepared of 1 gallon of 0-30-30 fertilizer with 2.89 lbs $H_3PO_3$, 2.99 lbs KOH, and 0.84 lbs citric acid. Two quarts can be added to as little as 20 gallons of water of pH between 6.5 to 8.5 and up to 300 gallons of water of pH between 6.5 and 8.5. The pH of the final solution is between 5.5 and 6.5 without precipitation.

EXAMPLE 7

A formulation was prepared of 1 gallon of 0-30-0 fertilizer having 4.8% iron with 2.89 $H_3PO_3$, 1.75 lbs iron-citrate, 0.74 lbs KOH, 0.62 lbs NaOH, and 2.00 lbs of 58% $NH_4OH$. Two quarts of the formulation can be added to as little as 20 gallons of water pH 6.5 to 8.5 and up to 300 gallons of water of pH 6.5 to 8.5. The pH of the final solution is between 5.5 to 6.7 without precipitation.

EXAMPLE 8

A formulation was prepared of 1 gallon of 0-30-0 fertilizer having 23.22% manganese with 2.89 $H_3PO_3$, 7.16 lbs. $Mn(H_2PO_2)_2$, and 0.133 lbs. sodium citrate. Two quarts of the formulation can be added to as little as 20 gallons of water pH 6.5 to 8.5 and up to 300 gallons of water of pH 6.5 to 8.5. The pH of the final solution is between 5.5 to 6.5 without precipitation.

EXAMPLE 9

A formulation was prepared of 1 gallon of 0-30-0 fertilizer having 57% copper with 2.89 $H_3PO_3$, 7.3 lbs $Cu(OH)_2$ (57% Cu), and 1.34 lbs of 58% $NH_4OH$. Two quarts can be added to as little as 20 gallons of water of pH 6.5 to 8.5 up to 300 gallons of water of pH 6.5 to 8.5. The pH of the final solution is between 5.5 to 6.5. The copper is not fully soluble, however this is desirable in that it prevents the rapid uptake of copper when applied to plant foliage.

What is claimed is:

1. A concentrated phosphorus fertilizer comprising a buffered composition comprising at least one phosphorous-containing acid or salt thereof such that when said composition is diluted with water having a pH of about 6.5 at a ratio of about 1 part fertilizer to about 40 parts water, there is formed a substantially fully solubilized use-dilution fertilizer having a foliage-acceptable pH for phosphorus uptake.

2. The phosphorus fertilizer of claim 1 wherein said phosphorous-containing acid is selected from the group consisting of phosphorous acid, hypophosphorous acid, polyphosphorous acid, and polyhypophosphorous acid.

3. The phosphorus fertilizer of claim 1 wherein said phosphorous-containing acid or salt thereof is present in an amount of about 30 to about 40 weight percent.

4. The phosphorus fertilizer of claim 1 wherein said buffered composition comprises at least one organic acid or salt thereof in an amount sufficient to form a double or multiple buffer with said phosphorus-containing acid agent.

5. The phosphorus fertilizer of claim 4 wherein said organic acid is selected from the group consisting of dicarboxylic acids and tricarboxylic acids.

6. The phosphorus fertilizer of claim 4 wherein said organic acid is citric acid.

7. The phosphorus fertilizer of claim 1 wherein said use-dilution fertilizer a pH in the range of about 5.0 to 7.0.

8. The phosphorus fertilizer of claim 1 further comprising at least one plant nutrient is selected from the group consisting of nitrogen, potassium, sulfur, calcium, magnesium, boron, iron, manganese, molybdenum, zinc, sulfur and ammonia.

9. The phosphorus fertilizer of claim 1 that is in a liquid form.

10. The phosphorus fertilizer of claim 1 that is in a solid form.

11. A concentrated phosphorus fertilizer comprising a buffered composition comprising a phosphorous-containing acid or salt thereof such that when said composition is diluted with water having a pH as high as about 8.5 at a ratio of about 1 part fertilizer to about 40 parts water, there is formed a substantially fully solubilized use-dilution fertilizer having a foliage-acceptable pH for phosphorus uptake.

12. The phosphorus fertilizer of claim 11 wherein said phosphorous-containing acid is selected from the group consisting of phosphorous acid, hypophosphorous acid, polyphosphorous acid, and polyhypophosphorous acid.

13. The phosphorus fertilizer of claim 11 wherein said phosphorous-containing acid or salt thereof is present in an amount of about 30 to about 40 weight percent.

14. The phosphorus fertilizer of claim 11 wherein said buffered composition comprises at least one organic acid or salt thereof in an amount sufficient to form a double or multiple buffer with said phosphorus-containing acid agent.

15. The phosphorus fertilizer of claim 14 wherein said organic acid is selected from the group consisting of dicarboxylic acids and tricarboxylic acids.

16. The phosphorus fertilizer of claim 14 wherein said organic acid is citric acid.

17. The phosphorus fertilizer of claim 11 wherein said use-dilution fertilizer a pH in the range of about 5.0 to 7.0.

18. The phosphorus fertilizer of claim 11 further comprising at least one plant nutrient is selected from the group consisting of nitrogen, potassium, sulfur, calcium, magnesium, boron, iron, manganese, molybdenum, zinc, sulfur and ammonia.

19. The phosphorus fertilizer of claim 11 that is in a liquid form.

20. The phosphorus fertilizer of claim 11 that is in a solid form.

21. A concentrated phosphorus fertilizer comprising a buffered composition comprising a phosphorous-containing acid or salt thereof such that when said composition is diluted with water having a pH of about 6.5 at a ratio as high as about 1 part fertilizer to about 600 parts water, there is formed a substantially fully solubilized use-dilution fertilizer having a foliage-acceptable pH for phosphorus uptake.

22. The phosphorus fertilizer of claim 21 wherein said phosphorous-containing acid is selected from the group consisting of phosphorous acid, hypophosphorous acid, polyphosphorous acid, and polyhypophosphorous acid.

23. The phosphorus fertilizer of claim 21 wherein said phosphorous-containing acid or salt thereof is present in an amount of about 30 to about 40 weight percent.

24. The phosphorus fertilizer of claim 21 wherein said buffered composition comprises at least one organic acid or salt thereof in an amount sufficient to form a double or multiple buffer with said phosphorus-containing acid agent.

25. The phosphorus fertilizer of claim 24 wherein said organic acid is selected from the group consisting of dicarboxylic acids and tricarboxylic acids.

26. The phosphorus fertilizer of claim 24 wherein said organic acid is citric acid.

27. The phosphorus fertilizer of claim 21 wherein said use-dilution fertilizer a pH in the range of about 5.0 to 7.0.

28. The phosphorus fertilizer of claim 21 further comprising at least one plant nutrient is selected from the group consisting of nitrogen, potassium, sulfur, calcium, magnesium, boron, iron, manganese, molybdenum, zinc, sulfur and ammonia.

29. The phosphorus fertilizer of claim 21 that is in a liquid form.

30. The phosphorus fertilizer of claim 21 that is in a solid form.

31. A concentrated phosphorus fertilizer comprising a buffered composition comprising a phosphorous-containing acid or salt thereof such that when said composition is diluted with water having a pH as high as about 8.5 at a ratio as high as about 1 part fertilizer to about 600 parts water, there is formed a substantially fully solubilized use-dilution fertilizer having a foliage-acceptable pH for phosphorus uptake.

32. The phosphorus fertilizer of claim 31 wherein said phosphorous-containing acid is selected from the group consisting of phosphorous acid, hypophosphorous acid, polyphosphorous acid, and polyhypophosphorous acid.

33. The phosphorus fertilizer of claim 31 wherein said phosphorous-containing acid or salt thereof is present in an amount of about 30 to about 40 weight percent.

34. The phosphorus fertilizer of claim 31 wherein said buffered composition comprises at least one organic acid or salt thereof in an amount sufficient to form a double or multiple buffer with said phosphorus-containing acid agent.

35. The phosphorus fertilizer of claim 34 wherein said organic acid is selected from the group consisting of dicarboxylic acids and tricarboxylic acids.

36. The phosphorus fertilizer of claim 34 wherein said organic acid is citric acid.

37. The phosphorus fertilizer of claim 31 wherein said use-dilution fertilizer a pH in the range of about 5.0 to 7.0.

38. The phosphorus fertilizer of claim 31 further comprising at least one plant nutrient is selected from the group consisting of nitrogen, potassium, sulfur, calcium, magnesium, boron, iron, manganese, molybdenum, zinc, sulfur and ammonia.

39. The phosphorus fertilizer of claim 31 that is in a liquid form.

40. The phosphorus fertilizer of claim 31 that is in a solid form.

41. A method of providing phosphorus to a plant comprising diluting the concentrated phosphorus fertilizer of claim 1 with water to form a use-dilution fertilizer and applying said use-dilution fertilizer to a plant.

42. The method of claim 41 wherein said use-dilution fertilizer is applied to the foliage of said plant.

43. A method of providing phosphorus to a plant comprising diluting the concentrated phosphorus fertilizer of claim 11 with water to form a use-dilution fertilizer and applying said use-dilution fertilizer to a plant.

44. The method of claim 43 wherein said use-dilution fertilizer is applied to the foliage of said plant.

45. A method of providing phosphorus to a plant comprising diluting the concentrated phosphorus fertilizer of claim 21 with water to form a use-dilution fertilizer and applying said use-dilution fertilizer to a plant.

46. The method of claim 45 wherein said use-dilution fertilizer is applied to the foliage of said plant.

47. A method of providing phosphorus to a plant comprising diluting the concentrated phosphorus fertilizer of claim 31 with water to form a use-dilution fertilizer and applying said use-dilution fertilizer to a plant.

48. The method of claim 31 wherein said use-dilution fertilizer is applied to the foliage of said plant.

49. A concentrated phosphorus fertilizer comprising a buffered composition comprising at least one phosphorous-containing acid or salt thereof such that when said composition is diluted with water having a pH of as low as about 6.5 at a ratio as high as about 1 part fertilizer to about 40 parts water, there is formed a substantially fully solubilized use-dilution fertilizer having a foliage-acceptable pH for phosphorus uptake.

50. A concentrated phosphorus fertilizer comprising a buffered composition comprising at least one phosphorous-containing acid or salt thereof such that when said composition is diluted with water having a pH of as high as about 8.5 at a ratio as high as about 1 part fertilizer to about 40 parts water, there is formed a substantially fully solubilized use-dilution fertilizer having a foliage-acceptable pH for phosphorus uptake.

51. A concentrated phosphorus fertilizer comprising a buffered composition comprising at least one phosphorous-containing acid or salt thereof such that when said composition is diluted with water having a pH of as low as about 6.5 at a ratio as low as about 1 part fertilizer to about 600 parts water, there is formed a substantially fully solubilized use-dilution fertilizer having a foliage-acceptable pH for phosphorus uptake.

52. A concentrated phosphorus fertilizer comprising a buffered composition comprising at least one phosphorous-containing acid or salt thereof such that when said composition is diluted with water having a pH of as high as about 8.5 at a ratio as low as about 1 part fertilizer to about 600 parts water, there is formed a substantially fully solubilized use-dilution fertilizer having a foliage-acceptable pH for phosphorus uptake.

* * * * *

UNITED STATES PATENT AND TRADEMARK OFFICE
CERTIFICATE OF CORRECTION

PATENT NO. : 5,830,255  Page 1 of 3
DATED : November 3, 1998
INVENTOR(S) : Carol J. Lovatt It is certified that error appears in the above-indentified patent and that said Letters Patent is hereby corrected as shown below:

On the title page, item [56]

References Cited, FOREIGN PATENT DOCUMENTS, Line 2:

Replace:   "2378587    1/1979    France    71/64.1"
With:      --2389587   1/1979    France    71/64.1--

References Cited, FOREIGN PATENT DOCUMENTS, Line 3:

Replace:   "34171331   11/1985   Germany   71/11"
With:      --3417133   11/1985   Germany   71/11--

References Cited, OTHER PUBLICATIONS, Line 5:

Replace:   "p. 224 (1992)."
With:      --p. 244 (1992).-- at [57] ABSTRACT, Line 1:

Insert before line 1 paragraph 1 attached

UNITED STATES PATENT AND TRADEMARK OFFICE
CERTIFICATE OF CORRECTION

PATENT NO.  : 5,830,255  Page 2 of 3
DATED       : November 3, 1998
INVENTOR(S) : Carol J. Lovatt It is certified that error appears in the above-indentified patent and that said Letters Patent is hereby corrected as shown below:

[57] ABSTRACT, Line 1:

Replace: "Concentrated phosphorus fertilizers are disclosed that comprise a buffered Composition of an organic acid and salts thereof and a phosphorous-containing acid and salts thereof."

With: --Concentrated phosphorous fertilizers are disclosed that comprise a buffered composition of a phosphorous-containing acid or salt thereof.--

Claim 7, Column 8, Line 67:

Replace: "use-dilution fertilizer a pH in the range of about 5.0 to 7.0."

With: --use-dilution fertilizer has a pH in the range of about 5.0 to 7.0.--

Claim 17, Column 9, Line 33:

Replace: "use-dilution fertilizer a pH in the range of about 5.0 to 7.0."

With: --use-dilution fertilizer has a pH in the range of about 5.0 to 7.0.--

UNITED STATES PATENT AND TRADEMARK OFFICE
CERTIFICATE OF CORRECTION

PATENT NO. : 5,830,255
DATED : November 3, 1998
INVENTOR(S) : Carol J. Lovatt

It is certified that error appears in the above-indentified patent and that said Letters Patent is hereby corrected as shown below:

Claim 18, Column 9, Line 35:

Replace: "comprising at least one plant nutrient is selected from the group"

With: --comprising at least one plant nutrient selected from the group--

Claim 27, Column 9, Line 67:

Replace: "use-dilution fertilizer a pH in the range of about 5.0 to 7.0."

With: --use-dilution fertilizer has a pH in the range of about 5.0 to 7.0.--

Claim 37, Column 10, Line 34:

Replace: "use-dilution fertilizer a pH in the range of about 5.0 to 7.0."

With: --use-dilution fertilizer has a pH in the range of about 5.0 to 7.0.--

Claim 38, Column 10, Line 36:

Replace: "comprising at least one plant nutrient is selected from the group"

With: --comprising at least one plant nutrient selected from the group--

Signed and Sealed this

Eighth Day of February, 2000

Q. TODD DICKINSON

Attesting Officer

Commissioner of Patents and Trademarks

US005830255B1

REEXAMINATION CERTIFICATE (4116th)

United States Patent [19]

Lovatt

[11] B1 5,830,255
[45] Certificate Issued   *Jul. 11, 2000

[54] FORMULATION OF PHOSPHORUS FERTILIZER FOR PLANTS

[75] Inventor: Carol J. Lovatt, Riverside, Calif.

[73] Assignee: The Regents of the University of California, Oakland, Calif.

Reexamination Requests:
No. 90/005,297, Mar. 17, 1999
No. 90/005,339, Apr. 7, 1999

Reexamination Certificate for:
Patent No.: 5,830,255
Issued: Nov. 3, 1998
Appl. No.: 08/642,574
Filed: May 3, 1996

[ * ] Notice: This patent is subject to a terminal disclaimer.

Related U.S. Application Data

[63] Continuation of application No. 08/192,508, Feb. 7, 1994, Pat. No. 5,514,200.

[51] Int. Cl.$^7$ .................................................. C05B 15/00
[52] U.S. Cl. .......................... 71/11; 71/27; 71/32; 71/41; 71/64.1
[58] Field of Search .................................. 71/11, 27, 32, 71/41, 64.1

[56] References Cited

U.S. PATENT DOCUMENTS

| | | |
|---|---|---|
| 1,976,905 | 10/1934 | Thordarson . |
| 2,663,628 | 12/1953 | Thomsen . |
| 3,342,598 | 9/1967 | Bard . |
| 3,798,020 | 3/1974 | Parham, Jr. et al. . |
| 3,941,896 | 3/1976 | Smith et al. . |
| 3,969,293 | 7/1976 | White et al. . |
| 4,066,390 | 1/1978 | Christie et al. . |
| 4,075,324 | 2/1978 | Thizy et al. . |
| 4,334,905 | 6/1982 | Wagner et al. . |
| 5,099,049 | 3/1992 | Chamberlain . |
| 5,395,418 | 3/1995 | Vetanovetz et al. . |

FOREIGN PATENT DOCUMENTS

| | | |
|---|---|---|
| 2359077 | 7/1976 | France . |
| 2389587 | 1/1979 | France . |
| 3417133 | 11/1985 | Germany . |
| 61-291482 | 12/1986 | Japan . |
| 4-74784 | 3/1992 | Japan . |
| 655373 | 4/1979 | U.S.S.R. . |
| 86/00613 | 1/1986 | WIPO . |

OTHER PUBLICATIONS

Hartley et al., part of "Experimental Methods for Studying Equilibria I," chapter 7 in *Solution Equilibria*, Ellis Horwood Limited, 1980, pp. 124–127. (No Month).
Guest and Grant, "The Complex Action of Phosphonates as Antifungal Agents," *Biological Review*, 66, 1991, pp. 159–187. (No Month).
Lovatt, "Avocado Research Project Plan and Grant Requirements," a grant proposal presented to the California Avocado Society for fiscal year 1990–199. (No Month).

"Declaration of Carol J. Lovatt in Opposition to Motion for Preliminary Injunction," declaration submitted in Rhone–Poulenc, Agrochime, S.A. v. Biagro Western Sales Inc., U.S. District court, Eastern District of California, Case No. CV–F–94–5734 OWW/SSH, executed Sep. 17,1994, filed Sep. 21, 1994.
Labels for "Resistim," a product of Mandops (UK) Limited, undated but believed to be before Feb. 7, 1993.
Product catalog of Biagro (Bioestimulantes Agricolas, S.A.), a Spanish company, undated but believed to be before Feb. 7, 1993, (with one English translation of all of the fifth page (the page containing Metalosate–F product) and another English translation of only the three Metalosate product on the fifth page).
Product information on "Metalosate" products of of Biagro (Bioestimulantes Agricolas, S.A.), a Spanish company, undated but believed to be before Feb. 7, 1993 (with two English translations attached).
Letter from the California Department of Food and Agriculture, dated Nov. 17, 1993, to Biagro Western Sales, Inc., and attached labeling information.
Biagro Western Sales, Inc.'s product literature on "Span Products," undated but believed to be published in or after Mar. 1993.
Adams and Conrad, "Transition of Phosphite to Phosphate in Soils," *Soil Science*, 75, pp. 361–371, 1953. (No Month).
Bompeix et al., "Modalités de l'obtention des nécroses bloquantes sur feuilles détachées de Tomate par l'action du tris–O–éthyl phosphonate d'aluminium (phoséthyl d'aluminium), hypothéses sur son mode d'action in vivo," *Ann. Phytophathol.*, 12:4, pp. 337–351, 1980 (French with English translation). (No Month).
Bompeix et al., "Mode d'action du phoseéthyl al," *Phytiatrie–Phytopharmacie*, 30, pp. 257–272, 1981 (French with English translation). (No Month).
Fenn and Coffey, "Studies on the In Vitro and In Vivo Antifungal Activity of Fosetyl–Al and Phosphorous Acid," *Phytopathology*, 74, pp. 606–611, 1984. (No Month).
Toerlen and Slabbert, "Phosphorous Nutrition of Avocados Through Truck Injection," *Avocado Grower*, p. 10, 1985 (No Month).
Lovatt, Carol J., "Foliar Phosphorus Fertilization of Citrus by Foliar Application of Phosphite," *Summary of Citrus Research*, pp. 25–26, Spring 1990. (No Month).
Hartley et al., "Solution Equilibria, "pp. 124–127 and 276–277, 1980. (No Month).
Unknown, "Don't Back Away from a Phosphite Confrontation," (unknown publication), p. 5, Apr. 21, 1992.

(List continued on next page.)

*Primary Examiner*—Wayne A. Langel

[57] ABSTRACT

Concentrated phosphorus fertilizers are disclosed that comprise a buffered composition of an organic acid and salts thereof and a phosphorous-containing acid and salts thereof. The concentrated phosphorus fertilizers can be diluted with water of pH ranging from about 6.5 to about 8.5 at ratios of concentrate to water at about 1:40 to about 1:600 to result in a fertilizer having a pH in the range acceptable for foliar uptake of phosphorus.

OTHER PUBLICATIONS

University of California News Release, "UCR Phosphite Fertilization Research Could Yield Double Benefit for Avocado Growers," undated (but contains substantially identical information as "Avocado Research Project Plan" dated 1990–91). (No Month).

Abstract entitled "Agricola (1970–1978)," (unknown publication), 1 page, 1992.

Obreza et al., "Citrus Fertilizer Management on Calcareous Soils," Circular 1127 in a series of the Soil and Water Science Department, Florida Cooperative Extension Service, Institute of Food and Agricultural Sciences, University of Florida, Dec. 1993.

Rothbaum et al., "The Use of Red Phosphorus as a Fertiliser. Part 1. Rates of Oxidation of Red Phosphorus in Soil," *New Zealand Journal of Science,* 7, pp. 51–66, 1964. (No Month).

Rothbaum and Kitt, "The Use of Red Phosphorus as a Fertiliser. Part 2. Extended Studies on Oxidation Rates of Red Phosphorus," *New Zealand Journal of Science,* 7, pp. 67–74, 1964. (No Month).

Widdowson et al., "The Use of Red Phosphorus as a Fertiliser. Part 3. Spot Trials with Perennial Ryegrass and White Clover," *New Zealand Journal of Science,* 7, pp. 427–445, 1964. (No Month).

Rothbaum and Baillie, "The Use of Red Phosphorus as a Fertiliser. Part 4. Phosphite and Phosphate Retention in Soils," *New Zealand Journal of Science,* 7, pp. 446–451, 1964. (No Month).

Rothbaum, H.P., "The Use of Red Phosphorus as a Fertiliser. Part 5. The Effect of Copper on the Oxidation Reaction of Red Phosphorus," *New Zealand Journal of Science,* 8, pp. 388–397, 1965. (No Month).

CAB Abstracts: (i) Sparks, "Growth of Nutrition of Pecan Seedlings from Potassium Phosphate Foliar Sprays" *HortScience,* 21, pp. 451–453, 1986; and (ii) Yuda et al., "Search for Efficient Phosphorus Fertilization," *Proc. Intern'l. Soc. Citriculture,* 1981. (No Month).

Lucas et al., "Phosphite Injury to Corn," *Agronomy Journal,* 71, pp. 1063–1065, 1979. (No Month).

Sukarno et al., "The Effect of Fungicides on Vesicular–Arbuscular Mycorrhizal Symbiosis," (publication unknown), pp. 139–147, 1993. (No Month).

Fenn and Coffey, "Quantification of Phosphonate and Ethyl Phosphonate in Tobacco and Tomato Tissues and Significance for the Mode of Action of Two Phosphonate Fungicides," *Phytopathology,* 79, pp. 76–82, 1989. (No Month).

Ouimette and Coffey, "Comparative Antifungal Activity of Four Phosphonate Compounds Against Isolates of Nine Phytophthora Species," *Phytopathology,* 79, pp. 761–767, 1989. (No Month).

Smillie et al., "The Mode of Action of Phosphite: Evidence for Both Direct and Indirect Modes of Action on Three Phytophthora spp. in Plants," *Phytopathology,* 79, pp. 921–926, 1989. (No Month).

Muchovej et al., "Effect of Exchangeable Soil Aluminum and Alkaline Calcium Salts on the Pathogenicity and Growth of *Phytophthora capsici* from Green Pepper," *Phytopathology,* 70, pp. 1212–1214, 1980. (No Month).

Tsubota, Goro, "Phosphate Reduction the Paddy Field I, "Soil and Plant Food, 5(1), pp. 10–15, 1959. (No Month).

Lovatt, C.J., "a Definitive Test to Determine Whether Phosphite Fertilization Can Replace Phosphate Fertilization to Supply P in the Metabolism of 'Hass' on Duke 7. A Preliminary Report," *Proc. of Second World Avocado Congress,* p. 244 (1992). No Month.

Unknown, "Foliar Applications Do Double Duty," *Citrograph,* 75(7), p. 161 (May 1990).

MacIntire et al., "Fertilizer Evaluation of Certain Phosphorus, Phosphorous, and Phosphoric Materials by Means of Pot Cultures," *Agronomy Journal,* 42(11), pp. 543–549 (Nov. 1950).

Grossl et al., "Precipitation of Dicalcium Phosphate Dihydrate in the Presence of Organic Acids," *Soil Science Society of America Journal,* 55(3), pp. 670–675 (May–Jun. 1991).

Product Information Brochure for "Supa Stand Phos: Supa Protective Pop–Up Starter," published by Agrichem Manufacturing Ind.: Australia, 2 pages (Aug. 1990).

Product Information Brochure for "Supa Stand Phos" Supa Crop, subtitled "For the Cotton Farmer," published by Agrichem Manufacturing Ind.: Australia, 1 page (Oct. 1990).

Product Information Brochure for "Supa Stand Phos: Supa Crop," subtitled "For the Cotton and Corn Farmer," published by Agrichem Manufacturing Ind.: Australia, 1 page (Oct. 1990).

Product Information Brochure for "Supa Stand Phos: Supa Protective Pop–Up Starter," (with "Together We Grow . . . Naturally" at bottom), published by Agrichem Manufacturing Ind.: Australia, 2 pages. (No Date Available).

Product Information Brochure for "Kelpak: Liquid Seaweed Concentrate 'Ecklonia Maxima'," published by Agrichem Manufacturing Ind.: Australia, 1 page. (No Date Available).

Product Information Brochure for "Organic Extract: Typical Analysis," published by Agrichem Manufacturing Ind.: Australia, 1 page. (No Date Available).

Agrichem Product Sheet for Supa K30, published by Agrichem Manufacturing Ind.: Australia, 3 pages. (No Date Available).

Agrichem Product Sheet for Supa Link, published by Agrichem Manufacturing Ind.: Australia, 2 pages. (No Month Available).

Agrichem Product Sheet for Supa Stand Phos, published by Agrichem Manufacturing Ind.: Australia, 4 pages. (No Date Available).

Agrichem Product Sheet for Supa Crop, published by Agrichem Manufacturing Ind.: Australia, 1 page. (No Date Available).

Product and Technical Information Sheet for *Ascophyllum Nodosum* Seaweed Meal and Flour–Products, published by Acadian Seaplants Liimited, 2 pages. (No Date Available).

Product Sheet for Seaweed Products for Agriculture and Horticulture, published by Maxicorp, U.S.A., Inc., 5 pages. (No Date Available).

Product Data Sheet for "Corn Steep Liquor," published by Grain Processing Corporation, 1 page. (No Date Available).

Correspondence between Agrichem and Dept. of Primary Industries, Queensland Government. 24 pages. (No Date Available).

Lovatt, Carol J., "A Definitive Test to Determine Whether Phosphite Fertilization Can Replace Phosphate Fertilization to Supply P in the Metabolism of 'Hass' on 'Duke 7.' A Preliminary Report," 4 pages (1992). (No Month Available).

Frazier et al., "Crystallography and Equilibrium Solubility for Ammonium and Potassium Orthophosphites and Hypophosphites," *Fertilizer Research,* 33, pp. 161–168 (1992). (No Month Available).

Frazier and Waerstad, "Crystallography and Equilibrium Solubility for Ammonium and Potassium Orthophosphites and Hypophosphites," *Fertilizer Research,* 32, pp. 161–168, 1992.

H.E.Robertson and P.D. Boyer, "Orthophosphite as a Buffer for Biological Studies," *Archives of Biochemistry and Biophysics,* 62, 396–401, 1956.

Malacinski and Konetzka, "Bacterial Oxidation of Orthophosphite," *Journal of Bacteriology,* 91, 578–582, 1966.

Robertson and Boyer, "The Biological Inactivity of Glucose 6–Phsphite, Inorganic Phosphites and Other Phosphites," *Archives of Biochemistry and Biophysics,* 62, 380–395, 1956.

Lovatt, Carol J., "A Definitive Test to Determine Whether Phosphite Fertilization Can Replace Phosphate Fertilization to Supply P in the Metabolism of 'Hass' on 'Duke 7.' A Preliminary Report," *California Avocado Society 1990 Yearbook,* 74, pp. 61–64 (1990). (No Month Available).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 8, lines 15–22:

A formulation was prepared of 1 gallon of 0-30-0 fertilizer having 4.8% iron with 2.89 *lbs* $H_3PO_3$, 1.75 lbs iron-citrate, 0.74 lbs KOH, 0.62 lbs NaOH, and 2.00 lbs of 58% $NH_4OH$. Two quarts of the formulation can be added to as little as 20 gallons of water pH 6.5 to 8.5 and up to 300 gallons of water pH 6.5 to 8.5. The pH of the final solution is between 5.5 to 6.7 without precipitation.

Column 8, lines 25–31:

A formulation was prepared of 1 gallon of 0-30-0 fertilizer having 23.22% manganese with 2.89 lbs $H_3PO_3$, 7.16 lbs $Mn(H_2PO_2)_2$, and 0.133 *lbs* sodium citrate. Two quarts of the formulation can be added to as little as 20 gallons of water pH 6.5 to 8.5 and up to 300 gallons of water of pH 6.5 to 8.5. The pH of the final solution is between 5.5 to 6.5 without precipitation.

Column 8, lines 34–41:

A formulation was prepared of 1 gallon of 0-30-0 fertilizer having 57% copper with 2.89 *lbs* $H_3PO_3$, 7.3 lbs $Cu(OH)_2$ (57% Cu), and 1.34 lbs of 58% $NH_4OH$. Two quarts can be added to as little as 20 gallons of water pH 6.5 to 8.5 up to 300 gallons of water of pH 6.5 to 8.5. The pH of the final solution is between 5.5 to 6.5. The copper is not fully soluble, however this is desirable in that it prevents the rapid uptake of copper when applied to plant foliage.

AS A RESULT OF REEXAMINATION, IT HAS BEEN DETERMINED THAT:

Claims 3, 13, 23 and 33 are cancelled.

Claims 1, 11, 21, 31 and 49–52 are determined to be patentable as amended.

Claims 2, 4–10, 12, 14–20, 22, 24–30, 32, and 34–48, dependent on an amended claim, are determined to be patentable.

New claim 53 is added and determined to be patentable.

1. A concentrated phosphorus fertilizer comprising a buffered composition comprising at least one phosphorous-containing acid or salt thereof such that when said composition is diluted with water having a pH of about 6.5 at a ratio of about 1 part fertilizer to about 40 parts water, there is formed a substantially fully solubilized use-dilution fertilizer having a foliage-acceptable pH for phosphorus uptake *and wherein said phosphorous-containing acid or salt thereof is present in an amount of about 30 to about 40 weight percent.*

11. A concentrated phosphorus fertilizer comprising a buffered composition comprising a phosphorous-containing acid or salt thereof such that when said composition is diluted with water having a pH as high as about 8.5 at a ratio of about 1 part fertilizer to about 40 parts water, there is formed a substantially fully solubilized use-dilution fertilizer having a foliage-acceptable pH for phosphorus uptake *and wherein said phosphorous-containing acid or salt thereof is present in an amount of about 30 to about 40 weight percent.*

21. A concentrated phosphorus fertilizer comprising a buffered composition comprising a phosphorous-containing acid or salt thereof such that when said composition is diluted with water having a pH of about 6.5 at a ratio as high as about 1 part fertilizer to about 600 parts water, there is formed a substantially fully solubilized use-dilution fertilizer having a foliage-acceptable pH for phosphorus uptake *and wherein said phosphorous-containing acid or salt thereof is present in an amount of about 30 to about 40 weight percent.*

31. A concentrated phosphorus fertilizer comprising a buffered composition comprising at least one phosphorous-containing acid or salt thereof such that when said composition is diluted with water having a pH as high as about 8.5 at a ratio as high as about 1 part fertilizer to about 600 parts water, there is formed a substantially fully solubilized use-dilution fertilizer havng a foliage-acceptable pH for phosphous uptake *and wherein said phosporous-containing acid or salt thereof is present in an amount of about 30 to about 40 weight percent.*

49. A concentrated phosphorus fertilizer comprising a buffered composition comprising at least one phosphorous-containing acid or salt thereof such that when said composition is diluted with water having a pH as low as about 6.5 at a ratio as high as about 1 part fertilizer to about 40 parts water, there is formed a substantially fully solubilized use-dilution fertilizer having a foliage-acceptable pH for phosporus uptake, *wherein said phosphorous-containing acid or salt thereof is present in an amount of about 30 weight percent to about 40 weight percent, and wherein the buffered composition includes an organic acid or salt thereof.*

50. A concentrated phosphorus fertilizer comprising a buffered composition comprising at least one phosphorous-containing acid or salt thereof such that when said composition is diluted with water having a pH as high as about 8.5 at a ratio as high as about 1 part fertilizer to about 40 parts water, there is formed a substantially fully solubilized use-dilution fertilizer having a foliage-acceptable pH for phosphorus uptake, *wherein said phosphorous-containing acid or salt thereof is present in an amount of about 30 weight percent to about 40 weight percent, and wherein the buffered composition includes an organic acid or salt thereof.*

51. A concentrated phosphorus fertilizer comprising a buffered composition comprising at least one phosphorous-containing acid or salt thereof such that when said composition is diluted with water having a pH as low as about 6.5 at a ratio as low as about 1 part fertilizer to about 600 parts water, there is formed a substantially fully solubilized use-dilution fertilizer having a foliage-acceptable pH for phosphorus uptake, *wherein said phosphorous-containing acid or salt thereof is present in an amount of about 30 weight percent to about 40 weight percent, and wherein the buffered composition includes an organic acid or salt thereof.*

52. A concentrated phosphorus fertilizer comprising a buffered composition comprising at least one phosphorous-containing acid or salt thereof such that when said composition is diluted with water having a pH as high as about 8.5 at a ratio as low as about 1 part fertilizer to about 600 parts water, there is formed a substantially fully solubilized use-dilution fertilizer having a foliage-acceptable pH for phosphorus uptake, *wherein said phosphorous-containing acid or salt thereof is present in an amount of about 30 weight percent to about 40 weight percent, and wherein the buffered composition includes an organic acid or salt thereof.*

*53. A method of providing phosphorus to a plant comprising:*

*diluting the concentrated phosphorus fertilizer of claim 49, 50, 51, or 52 with water to form a use-dilution fertilizer and applying said use-dilution fertilizer to a plant.*

\* \* \* \* \*